Feb. 15, 1966 P. R. NUGENT 3,235,854
INFORMATION HANDLING APPARATUS
Filed March 3, 1961
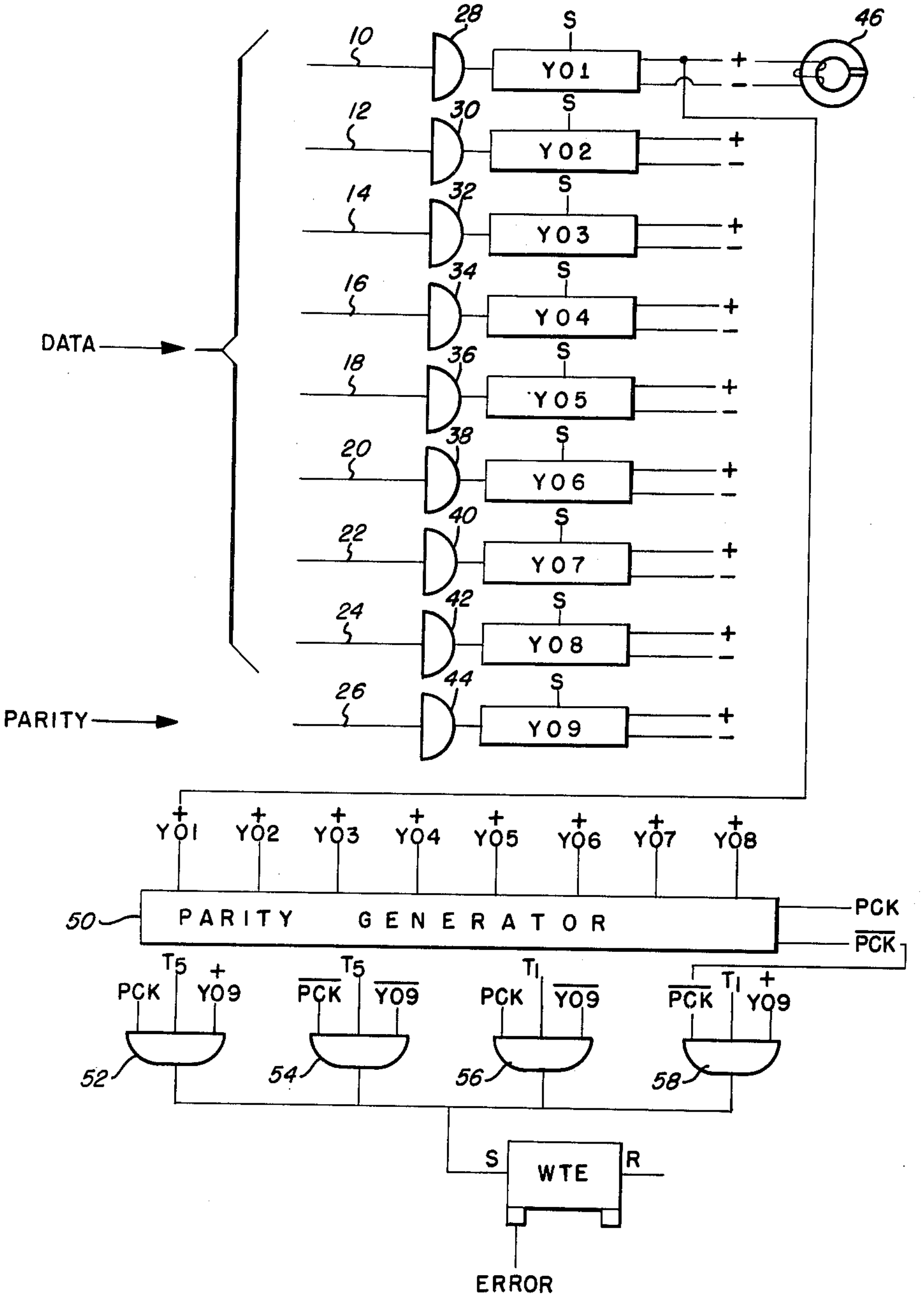
INVENTOR
PATRICK R. NUGENT
BY Henry L. Hanson
ATTORNEY United States Patent Office 3,235,854
Patented Feb. 15, 1966

3,235,854

INFORMATION HANDLING APPARATUS

Patrick R. Nugent, Wellesley, Mass., assignor to Honeywell Inc., a corporation of Delaware Filed Mar. 3, 1961, Ser. No. 93,122
3 Claims. (Cl. 340—174.1)

A general object of the present invention is to provide a new and improved checking circuit for a digital data transfer circuit. More specifically, the invention is concerned with a checking circuit for use with the energizing means of a multiple-bit recording circuit wherein the information handled is in the form of a plurality of data bits and an associated parity bit with the apparatus being characterized by its ability to perform an accurate check in the circuit operation up to the final point at which the recording of the information takes place.

One way in which digital information is stored is in magnetic tapes. These tapes are generally arranged to pass across the recording gap of a magnetic recording head which has applied thereto a suitable signal to vary the polarizing flux at the recording gap. The effect of this polarizing flux at the recording gap is to act upon the magnetic particles in the tape so that they will assume a magnetic orientation which is directly related to the input signal applied to the magnetic recording head. A form of recording which is particularly useful in the recording of digital data is the non-return-to-zero (NRZ) type recording wherein the recording of a bit of information may be related to the polarization of the flux at the gap of the recording head. In order words, the polarization may be considered as either in the positive or negative sense in accordance with the input signal applied to the head. The energization of the head may be by way of a binary counter stage, or binary flip-flop, whose output is reversed each time a predetermined input bit, such as a "one," is received. Such a non-return-to-zero type of recording scheme will be found discussed in detail in the copending application of W. D. Woo bearing Serial Number 76,351, filed December 16, 1960.

In order that a magnetic tape may be used efficiently, it is quite convenient to arrange the tape so that a plurality of channels can be recorded across the tape. In using multiple-channel recording, it is possible to record a plurality of bits simultaneously. As a matter of convenience, and as dictated by the associated using equipment, the bits recorded are generally recorded in terms of frames wherein each frame may be comprised of a plurality of information bits as well as certain check data. The check data, in its elemental form, may take the form of a parity bit.

In any recording circuitry, it is desirable to provide means for ensuring that the data recorded is recorded without error. By providing checking circuitry which looks at the electronic control circuitry at a point just prior to recording, there is reasonable assurance given that the presence of the correct signal at this location of the circuit will ensure the accuracy of the data recorded.

It is therefore an object of the present invention to provide a new and improved checking apparatus for a digital recorder which is adapted to perform its checking function at a point in the circuitry which will reasonably ensure that the recording is being carried out without error.

In a preferred embodiment of the invention, a plurality of magnetic recording heads were arranged to effect a parallel recording of information across a magnetic tape. The recording was carried out a frame at a time wherein each frame was comprised of a plurality of information bits and an associated parity bit which had been previously generated and appended to the frame to be carried therewith. As contemplated in the present invention, a plurality of binary counter stages or binary flip-flops were connected on their inputs to receive a frame of data and related parity bits so that the same would be recorded. The ouputs of these counter stages or flip-flops were arranged to control the direction of the signal currents through the individual recording heads so that when each particular one bit of a frame was applied to the associated counter stage, the polarity of energization of the recording head was reversed.

The outputs of the counter stages were then examined and a parity bit generated so that the same could be appropriately compared with the output of the counter stage having the frame parity bit as an input.

The logic of the checking circuitry for checking the operation at the binary counter stages feeding the recording heads was, in a preferred embodiment, arranged so that for every other frame, the presence of an identity condition in the parity generator and the output of the parity counter stage would indicate the presence of an error. During the occurrence of each frame between the aforementioned frames, the logical outputs of the parity generator and the parity binary counter stage were reversed so that an error would be indicated if the two outputs of the binary counter stage and the parity generator were different.

It is accordingly a further more specific object of the present invention to provide a new and improved checking apparatus for a data transfer circuit utilizing binary counter stages in the transfer circuit wherein the outputs of the counter stages are appropriately compared with the output on a parity generator so that an error will be indicated in the event that there is a circuit inoperability or an information transfer error occurring.

A still further more specific object of the invention is to provide a new and improved data transfer checking circuit wherein a plurality of binary stages are used in a transfer circuit and the outputs thereof compared such that a parity bit transferred through the transfer circuit may be appropriately compared with a parity bit generated from the data transferred and wherein a check is made to determine in a first frame transferred that there is no identity between the parity bit comparison signals and when the next frame is transferred a check is made to determine that there is identity between the parity bit signal generated and the parity bit transferred, as indicated by the output of the transfer circuit.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Referring to the single figure, there is illustrated a nine-channel transfer circuit wherein eight of the nine channels are adapted to transfer data bits, while the ninth channel is arranged to transfer a parity bit. Thus, the input lines 10, 12, 14, 16, 18, 20, 22 and 24 are arranged to pass data bits into a series of input gates. These gates are identified respectively as gates 28, 30, 32, 34, 36, 38, 40 and 42. The parity bit is arranged to be applied to an input line 26 which feeds into a gate 44. Each of the gating circuits may be suitably arranged so that an appropriate timing or clock signal is applied thereto in order to synchronize the parallel transfer of the informational bits therethrough for purposes of activating the circuits which directly control the recording operation which is to be performed. Connected to the output of the gating sections are a series of binary counter stages or binary flip-flops which are arranged so that upon the application of an input "one," the binary state of the output of the flip-flop will reverse. These flip-flops or counter stages are identified as YO1 through YO9.

The outputs of the binary counter stages YO are each coupled to a control winding on a recording head. Thus, a recording head such as the recording head in 46 is coupled to the output of the counter stage YO1. Similar recording heads will be connected to the output of the other counter stages YO2 through YO9. The circuit discussed thus far is of the general type contemplated in the aforementioned W. D. Woo application. Thus, as a frame of data and its associated parity bit is fed into the gating circuits, those gating circuits transferring a "one" will cause a reversal of the state of the associated binary counter stage or binary flip-flop connected to the output thereof. The resultant reversal of this counter stage will cause a reversal of the current flowing in the control winding of the associated recording head.

In order to ensure the accuracy of the information transferred to the control windings of the recording heads on the output of the circuit, it is desirable that a monitoring operation take place on the output windings of the counter stages or on the input windings of the associated recording heads. This checking operation is provided in the present invention by a new and improved checking circuit which takes into account the fact that the transfer circuits utilized in feeding information into the recording heads are not of the type normally contemplated in regular digital transfer circuits for the reason that the bistable states of the counter stages in the transfer circuit are switched only upon the occurrence of "ones." Thus, the normal expected relationship contemplated in the conventional transfer circuit with respect to the parity bit included therein is no longer valid when these special binary counter stages are used in the transfer circuit.

The transfer circuit utilized herein is checked by way of a parity generator 50 which is adapted to receive on its input the assertive outputs of each of the counter stages YO1 through YO8 and produce therefrom an output parity signal PCK if there is an even number of "ones" or assertive inputs from the YO stages. In the event that there is an odd number of assertive conditions indicated in the YO stages on the input of the parity generator 50, the output $\overline{PCK}$ will be active.

A series of logical gating circuits are provided in the gating circuits 52, 54, 56 and 58. The logic on these gating circuits is directly related to the expected signals on the output of the parity generator and the output of the parity transfer counter stage YO9. Because of the unique manner in which the counter stage YO9 functions with relation to the rest of the circuitry, the logic required for one frame will be examined at a particular clock time, for example, $T_5$. The next frame transferred to the reading heads will be examined in the opposite logical sense at time $T_1$.

The outputs of the gating circuits are so arranged that if a signal is transferred through any one of these circuits, a write tape error circuit WTE will be set to indicate that an error condition exists. This write tape error circuit WTE may take the form of a bistable flip-flop which, when once set, will remain set until such time as a reset pulse is applied thereto by some external control means.

The manner in which the circuit operates may thus be understood by following through the operation normally encountered in a typical recording of a word of information which is comprised of a series of frames. Prior to the start of running information through the associated recording heads, each of the binary counter stages YO1 through YO9 will be set to one of the two bistable states by way of the input set state S. It is assumed that this set signal switches all of the outputs of the YO stages so that they are zero or, in other words, so that the positive outputs illustrated in the drawing are inactive.

When a writing operation is to take place, the first input to the circuitry will take the form of a series of "ones" in all of the input data positions as well as in the parity positions. This will mean that all of the YO circuits will be switched so that the positive output terminals are active. It is assumed that this first frame of control bits will occur at clock time $T_1$. If all of the YO circuits were switched so that their positive output terminals are active, the parity generator 50 will produce an output control bit PCK. This PCK pulse will be examined in the gate 56 at time $T_1$ along with the output of the stage YO9. If the stage YO9 was not switched so that its positive output terminal was active, the gating circuit 56 will be opened and the set signal will be applied to the write tape error circuit WTE to indicate that an error has occurred. However, if the circuit is operating normally, the gate 56 will remain closed for the reason that with the parity signal PCK present, the signal $\overline{YO9}$ should not be present. Similarly, if one of the stages YO1 through YO8 did not switch to the state wherein the positive terminal is activated, the parity generator will have its output $\overline{PCK}$ active. In this event, the gate 58 will pass an output signal at time $T_1$ to the write tape error circuit WTE.

Assuming no error condition on the application of the first frame of bits thereto, the circuit will accept the second frame. It is assumed next that the second frame takes the form which is as follows:

| | Data | | Parity |
|---|---|---|---|
| Frame 2 | 1100 | 1001 | 1 |
| YO1–YO9 Output | 0011 | 0110 | 0 |

With this information having appropriately set the counter stages YO as indicated, a check will be made to determine if there is an error in the setting of the YO circuits. The checking in this instance is carried out in the gates 52 and 54 at time $T_5$. It will be noted that if the operation has been carried out without error, the parity generator 50 will have its output PCK active at time $T_5$ and the transfer circuit YO9 will have its output inactive. Consequently, neither of the gates 52 nor 54 will be opened at time $T_5$ to provide any signal for setting the write tape error circuit WTE.

It is next assumed that the third frame and the associated settings of the YO circuits occur as follows:

| | Data | | Parity |
|---|---|---|---|
| Frame 3 | 1110 | 1100 | 0 |
| YO1–YO9 Output | 1101 | 1010 | 0 |

The third frame will be examined at time $T_1$ and the logic is such that if the parity indication from the output of the circuit YO9 is not the same as the output of the parity generator, an error condition will be indicated as the result of a signal passing through the gating circuit 56 or 58.

The next frame to be transmitted is assumed to comprise a series of "ones" with the resultant setting of the YO circuits being indicated as follows:

| | Data | | Parity |
|---|---|---|---|
| Frame 4 | 1111 | 1111 | 1 |
| YO1–YO9 Output | 0010 | 0101 | 1 |

The checking circuit in this instance with respect to frame 4 will examine the setting of the parity generator and the output of the YO9 circuit at time $T_5$. If the outputs of the parity generator 50 and the YO circuit are identical, then a signal will pass through either the gate 52 or gate 54 to set the write tape error circuit.

With each new frame coming in, the operation will continue as described above with the frame parity checking being accomplished in alternate logical modes with each alternate frame.

From the foregoing description, it will be apparent that there has been provided a checking circuit which will indicate the presence of any errors in a transfer circuit utilizing binary counter stages as the transfer mechanism, and that this particular transfer mechanism is particularly adapted for use in controlling the energization of recording heads of a magnetic recording circuit.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. In combination, a plurality of digital data transfer stages each of which comprises a binary counter stage having input means for receiving signals representing inputs bits and output means switched to an opposite polarity each time a signal representing a preselected type of input bit is received, said input means connected to said plurality of transfer stages having signals thereon representing data bits and a signal representing a corresponding parity bit, a parity generator connected to the output of those transfer stages having signals representing data bits coupled thereto, a transfer error indicating circuit adapted to be activated upon the occurrence of a parity error, timing signal means including means for generating first and second time-spaced clocking signals, and circuit means coupling the output of said parity generator and the output of the one binary counter stage which is responsive to a signal representing a parity bit to the input of said error indicating circuit, said last-named circuit means comprising logical gating means having four gating sections, each of which has input means connecting signals from said parity generator and said one binary counter stage, and two of which have means connecting said first clocking signal thereto so that they are adapted to be clocked at one time and the other two of which have means connecting said second clocking signal thereto so that they are adapted to be clocked at a second time.

2. In combination, a plurality of digital data transfer stages each of which comprises a binary counter stage having input means for receiving signals representing input bits and output means switched to an opposite polarity each time a signal representing a pre-selected type of input bit is received, said input means connected to said plurality of transfer stages having signals thereon representing data bits and a signal representing a corresponding parity bit, a parity generator connected to the output of those transfer stages having signals representing data bits coupled thereto, a transfer error indicating circuit adapted to be activated upon the occurrence of a parity error, timing signal means including means for generating first and second time-spaced clocking signals, and circuit means coupling the output of said parity generator and the output of the one binary counter stage which is responsive to signals representing a parity bit to the input of said error-indicating circuit, said last-named circuit means comprising logical gating means having plural gating sections, each of which has input means connecting signals from said parity generator and said one binary counter stage, at least one of said gating sections having means connecting said first clocking signal thereto so as to be clocked at said first time and at least another one of said gating sections having means connecting said second clocking signal thereto so as to be clocked at said second time.

3. In combination, a plurality of digital data transfer stages each of which comprises a binary counter stage having input means for receiving signals representing input bits and output means switched to an opposite polarity each time a signal representing a pre-selected type of information bit is received, said input means connected to said plurality of transfer stages having signals thereon representing data bits and a signal representing a corresponding parity bit, a parity generator connected to the output of those transfer stages having signals representing data bits coupled thereto, a transfer error-indicating circuit adapted to be activated upon the occurrence of a parity error, timing means generating first and second timing signals spaced from each other, means coupling the output of said parity generator and the output of the binary counter stage which is responsive to a signal representing a parity bit input to the input of said error-indicating circuit, said last-named coupling means comprising four separate AND gating sections: the first of said AND gating sections comprising means to apply a signal representing the assertion output from said parity generator, a signal representing the assertion output of said one binary counter stage which is responsive to a signal representing a parity bit, and a first timing signal; the second of said AND gating sections comprising means to apply a signal representing the negation output from said parity generator, a signal representing the negation output of said one binary counter stage which is responsive to a signal representing a parity bit, and a first timing signal; the third of said AND gating sections comprising means to apply a signal representing the assertion output from said parity generator, a signal representing the negation output of said one binary counter stage which is responsive to a signal representing a parity bit, and a second timing signal; the fourth of said AND gating sections comprising means to apply a signal representing the negation output from said parity generator, a signal representing the assertion output of said one binary counter stage which is responsive to a signal representing a parity bit, and a second timing signal; and means connecting the output of each of said gating sections to said error-indicating means to cause an error indication if any one of said gating circuits passes a control signal.

References Cited by the Examiner

UNITED STATES PATENTS

| | | | |
|---|---|---|---|
| 2,702,380 | 2/1955 | Brustman | 340—147 |
| 2,848,607 | 8/1958 | Maron | 340—147 |
| 2,977,047 | 3/1961 | Block | 340—147 |
| 3,044,702 | 7/1962 | Cox | 340—146.1 |

IRVING L. SRAGOW, *Primary Examiner.*